March 31, 1942.  C. E. MEYERHOEFER  2,277,870
HEATER
Filed March 2, 1940  2 Sheets-Sheet 1
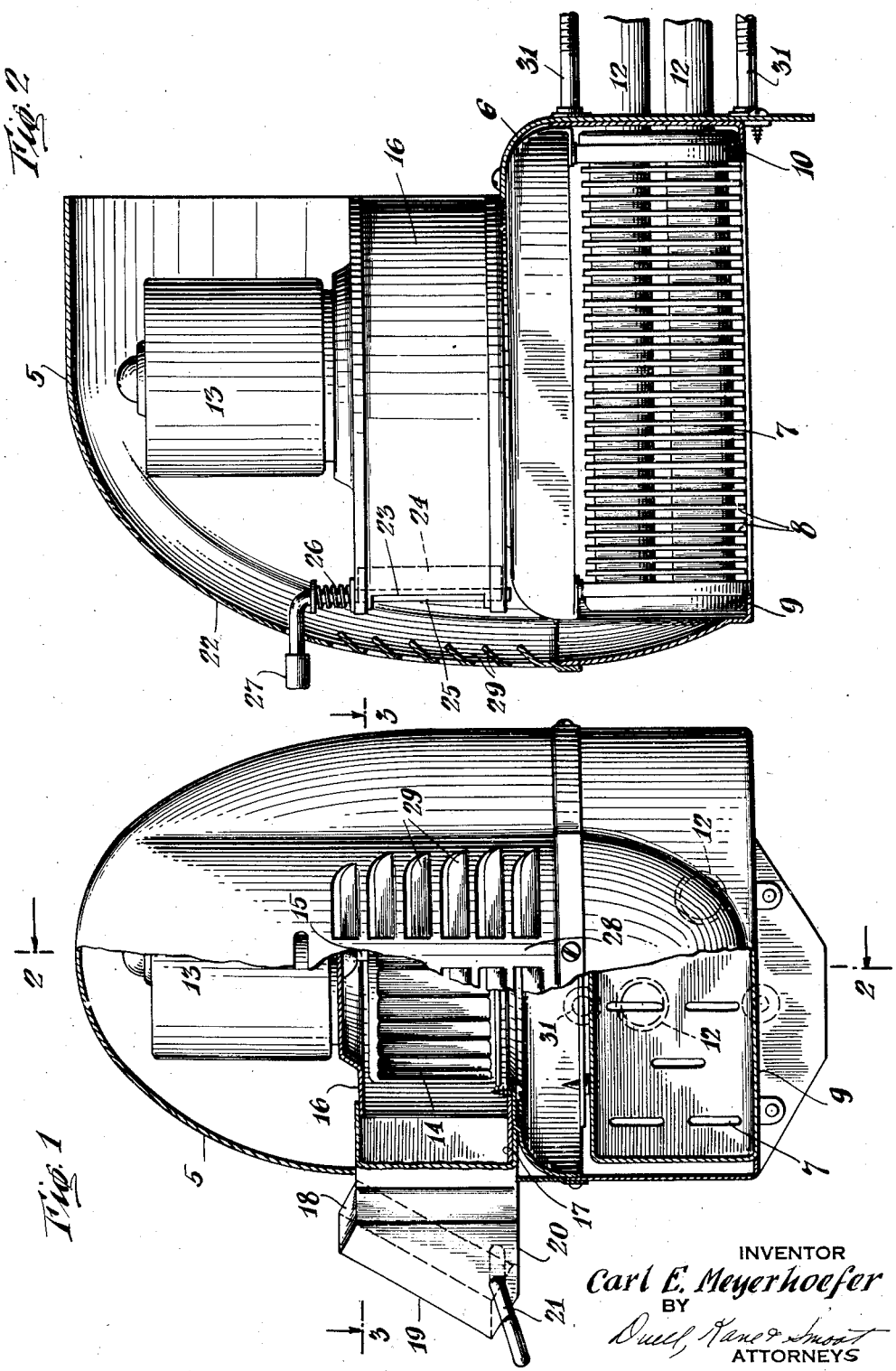
INVENTOR
Carl E. Meyerhoefer
BY
ATTORNEYS March 31, 1942.  C. E. MEYERHOEFER  2,277,870
HEATER
Filed March 2, 1940  2 Sheets-Sheet 2

INVENTOR
Carl E. Meyerhoefer
BY
ATTORNEYS

Patented Mar. 31, 1942

2,277,870

UNITED STATES PATENT OFFICE 2,277,870

HEATER

Carl E. Meyerhoefer, Brooklyn, N. Y., assignor to E. A. Laboratories, Inc., Brooklyn, N. Y., a corporation of New York Application March 2, 1940, Serial No. 321,940

5 Claims. (Cl. 257—137)

This invention relates to a structurally and functionally improved heat exchange device capable of use in numerous different associations, but ideally intended for employment in conjunction with motor vehicles for the purpose of heating the same.

It is an object of the invention to furnish a unit of this type which will be extremely compact and which may be inconspicuously disposed within the body of the vehicle, but which, at the same time, will be instantly available for control by the operator of such vehicle.

A further object of the invention is that of furnishing a heater which may be employed to warm the forward compartment of a motor vehicle and which will be of particular utility when utilized as a primary unit for windshield defrosting purposes.

Another object of the invention is that of furnishing a device of this character which will embody relatively few parts, each individually simple and rugged in construction, such parts being largely capable of manufacture by automatic or semi-automatic methods, and being, moreover, susceptible to ready assemblage by unskilled labor to provide a unit which will operate over long periods of time with freedom from all difficulties.

With these and other objects in mind, reference is had to the attached sheet of drawings illustrating one practical embodiment of the invention, and in which:

Fig. 1 is a partly sectional front view of a heater;

Fig. 2 is a sectional side view thereof, and taken along the line 2—2 and in the direction of the arrows, as indicated in Fig. 1.

Figure 3:
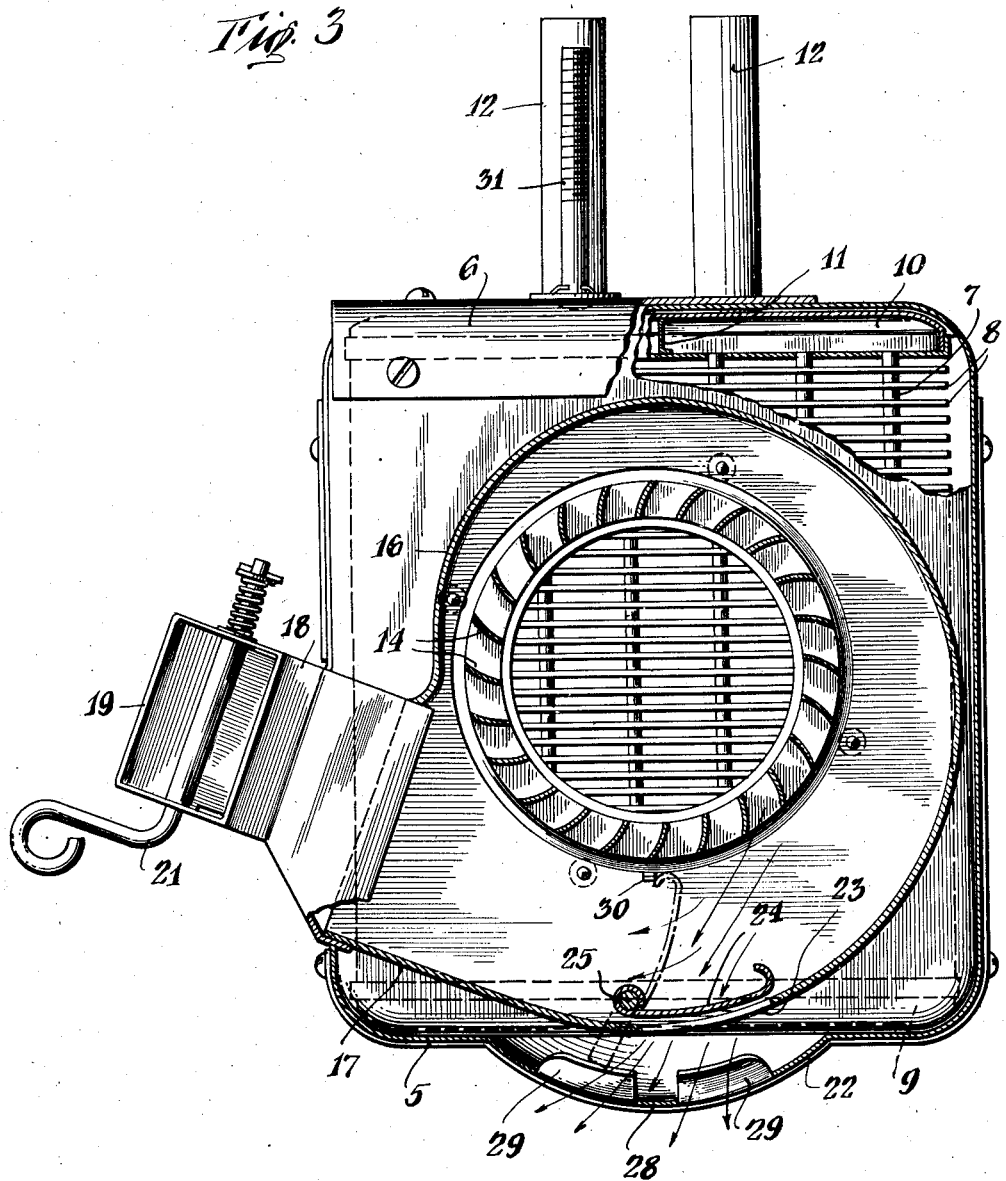
Fig. 3 is a sectional plan view taken along the line 3—3 and in the direction of the arrows, as indicated in Fig. 1.

In these views, the numeral 5 indicates a casing which—while it may embody any number of desired configurations—preferably follows generally that illustrated in the drawings. Adjacent the lower end of this casing, an enlargement 6 is provided which serves to accommodate a core generally including tubes 7 and heat dissipating fins 8, as well as head portions 9 and 10.

The head 9 is connected to all of the tubes 7, and permits free communication of fluid from one to the other. Head 10 is, on the other hand, furnished with a partition 11 so as to subdivide the tubes into two groups. To either side of this partition, conduits 12 are connected to the head 10. Thus, fluid may flow into one of these conduits and through substantially one-half of the tube 7, emerge from this set of tubes and flow through the head 9 to return through the balance of the tubes to head 10, and thence flow through the second conduit connected to the same.

These conduits are coupled to a source of heated fluid which may take numerous different forms. Preferably, however, flexible tubes are simply connected to the conduits 12, and in turn connected to the cooling system of the motor vehicle in a manner well known to the art. In this fashion, a flow of hot water through the core is assured.

Within the upper portion of housing 5, a motor 13 is disposed which is connected to a source of current supply preferably by means of a variable rheostat-switch (not shown). This motor serves to drive an air impeller which is conveniently in the form of a blower wheel 14 secured to the motor shaft 15. A housing 16 defines a passage of constantly increasing area between it and the edge of the blower wheel, and this passage terminates in a tangential extension 17 to which is coupled a fitting 18. This fitting preferably presents discharge openings 19 and 20, and adjacent the same, a valve controlling handle 21 is mounted, so that at the will of the operator all air discharged through the extension 17 may either be diverted through the opening 19 or the opening 20. Also, by suitably adjusting the valve 21, a part of the air may be simultaneously discharged through each of the openings.

As is well appreciated, the outlet 19 may be coupled to passages (not shown) which terminate in a nozzle or nozzles adjacent the surface of the windshield. The opening 20, on the other hand, preferably extends in a downward direction so that if the valve control 21 is accordingly adjusted, a greater or lesser portion of the discharged air is diverted towards the feet of the car operator.

The forward portion of the casing 5 is preferably bulged away from the surface which mounts the heater, as has been indicated at 22. The bulging is of such a nature that the inner surface of casing 5 is spaced from the outer face of the housing or casing 16. At this point, the casing 16 is formed with an opening 23 which may be substantially completely obstructed by a valve or flap 24. The latter is mounted upon a rod 25 rotatably supported by the casing 16. Any rattling of the parts may be prevented by employing, for example, a spring 26 in association with the rod, and bearing against the casing 16. The end of the rod is preferably extended as at 27 through a slot formed in the bulged portion 22 of the casing so as to furnish a handle for the ready manipulation of the valve 24.

As illustrated, the opening 23 is preferably slightly to one side of the center of the outer heater face. Such center is defined in the bulged portion 22 by a strip 28 to both sides of which this bulged portion is provided with a series of louvers 29. Also, as will be noted, a stop 30 may be provided adjacent the blower wheel 14 so that valve 24 may not be moved beyond the position indicated in dotted lines.

It is found that in such position, a certain amount of the air impelled by the blower wheel will be diverted by the valve or deflector 24 in the manner indicated by the arrows, and that a considerable portion of the air so diverted will strike against the inner face of strip 28, and be in turn diverted through the left hand group of louvers, as viewed in Fig. 3. Of course, an adequate supply of air will, nevertheless, pass through the right hand group of louvers. Additionally, a relatively large portion of the air will be discharged through the portion beyond the valve 24 and so through the fitting 18.

In operation, it is, of course, to be assumed that the heater has had its conduits 12 suitably connected to a source of heated fluid, or if the unit is to be employed for cooling purposes, that these conduits have been otherwise connected. Also, by means of the bolts 31, the heater has been mounted preferably upon the rear face of the dash and underneath the instrument panel of the car. Now, if current is supplied to the motor 13, air will be drawn upwardly through the core assembly and past the tube 7 and fins 8 thereof. The air, under normal circumstances, will be discharged through fitting 18, in accordance with the desires of the driver. It will also be noted that due to the fact of having the mounting members 31 in association with the relatively extended portion 6 of the casing, the upper part of the same will, under these circumstances, be spaced from the face of the dash so that adequate ventilation to the motor is assured.

If the driver desires that a certain amount of the air be diverted toward the bodies of, for example, the occupants of the front compartment, he may, by shifting handle 27, readily direct a flow of a greater or lesser amount of air in that direction. Likewise, of course, he may divert either towards his feet or towards the windshield nozzles, or any other passage connected to the fitting 18, a greater or lesser volume of air. Further adjustment will be permissible if—in accordance with conventional practice—the speed of the motor 13 is susceptible of being controlled.

Thus, among others, it will be obvious that the several objects of the invention, as specifically afore noted, are achieved. Obviously, numerous changes in construction and re-arrangements of the parts may be resorted to without departing from the spirit of the invention, as defined by the claims.

Having described my invention, what I now claim is:

1. A heater including a blower wheel, a casing enclosing the same to receive air from said wheel, a core disposed adjacent said wheel and through which air is to flow in heat exchange contact towards the latter, a second casing enclosing said core and said blower wheel, said first named casing being formed with an opening, means shiftable to a position to obstruct said opening whereby all air will flow through said first named casing, and said second casing being formed with two series of louvers adjacent the opening of said first named casing, a strip forming a part of said second casing and separating said louvers from each other and said obstructing means being shiftable to a position such that air is deflected through the opening in said first named casing and is further deflected by the inner face of said strip and caused to flow through both of said series of louvers.

2. A heater including a blower wheel, a casing enclosing the same to receive air from said wheel, a core disposed adjacent said wheel and through which air is to flow in heat exchange contact towards the latter, a second casing enclosing said core and said blower wheel, said first named casing being formed with an opening, means shiftable to a position to obstruct said opening whereby all air will flow through said first named casing, and said second casing being formed with openings adjacent the opening of said first named casing, a strip forming a part of said second casing, said obstructing means being shiftable to a position such that air is deflected through the opening in the first named casing and is further deflected by the strip and caused to flow through the openings of said second casing.

3. A heater including a blower wheel, a casing enclosing the same to receive air from said wheel, a core disposed adjacent said wheel and through which air is to flow in heat exchange contact towards the latter, a second casing enclosing said core and said blower wheel, said first named casing being formed with an opening, means shiftable to a position to obstruct said opening whereby all air will flow through said first named casing, and said second casing being formed with openings adjacent the opening of said first named casing, deflecting means adjacent said second casing openings, said obstructing means being shiftable to a position such that air is deflected through the opening in said first named casing and is further deflected by said deflecting means and caused to flow through the openings in said second casing.

4. A heater including a blower wheel, a casing enclosing the same to receive air from said wheel, said casing comprising a curved passage of constantly increasing area between its defining walls and the blower wheel, a tangential portion extending from said curved passage, an opening in said curved passage in advance of said tangential portion, a heat exchange core disposed adjacent said wheel and through which air is to flow in heat exchange contact towards the latter, a second casing enclosing said core and said first casing, said second casing being formed with openings partially to one side of the opening in said first casing, means located between said first and second casing for deflecting air through said second casing openings and means for obstructing said first casing opening whereby all air will flow through said first named casing, said means being shiftable to a position such that air may be deflected through said opening and be further deflected by said deflecting means through the openings in said second casing.

5. A heater comprising in combination, a casing, an enlargement forming a part of said casing, a heat exchange member disposed within said enlargement and presenting passages through which air may flow, a curved housing disposed beyond said enlargement and said heater presenting an opening whereby all air entering said housing will first flow through said enlargement, a motor driven blower wheel mounted for rotation within said housing, the latter being eccentrically disposed with reference to said wheel and whereby a passage for increasing cross-sectional area is provided around said wheel, said housing being formed with a discharge opening adjacent the point of maximum area of said passage and being moreover formed with a further opening in advance of said first named opening, a valve comprising a pivotally mounted strip disposed within said housing and at a point beyond said further opening, said valve being shiftable to a position obstructing the flow of air through said further opening and also movable to a position such that it blocks said passage and extends from the inner face of said housing to a point adjacent the periphery of said blower wheel; in such position, said strip diverting the air discharged by said blower wheel in advance of said further opening through the latter, the body of said casing being extended to project beyond said housing and be spaced therefrom, said extended portion of the casing being formed with openings and whereby, with said strip in passage obstructing position, the air flowing through said further opening will be discharged through said latter casing openings.

CARL E. MEYERHOEFER.